United States Patent
Seubert et al.

(10) Patent No.: US 7,019,040 B2
(45) Date of Patent: Mar. 28, 2006

(54) PROCESS FOR THE PREPARATION OF POROUS POLYMER PARTICLES BASED ON ACRYLATE AND/OR METHACRYLATE

(75) Inventors: Andreas Seubert, Marburg (DE); Sandra Schuetze, Marburg (DE)

(73) Assignee: Metrohm AG, Herisau (CH)

( * ) Notice: Subject to any disclaimer, the term of this patent is extended or adjusted under 35 U.S.C. 154(b) by 0 days.

(21) Appl. No.: 10/684,428

(22) Filed: Oct. 15, 2003

(65) Prior Publication Data

US 2004/0082749 A1   Apr. 29, 2004

(30) Foreign Application Priority Data

Oct. 22, 2002   (EP) .................................. 02405903

(51) Int. Cl.
*C08J 9/26* (2006.01)

(52) U.S. Cl. ........................ 521/63; 526/210; 526/212; 526/319

(58) Field of Classification Search ................ 526/319, 526/210, 212; 521/63
See application file for complete search history.

(56) References Cited

U.S. PATENT DOCUMENTS 4,093,570 A * 6/1978 Miyake et al. ................ 521/63
6,653,252 B1 * 11/2003 Kawahara ................... 502/101

FOREIGN PATENT DOCUMENTS

| EP | 572 115 | 4/1993 |
| JP | 07109360 | 10/1993 |
| WO | WO 88/01164 | 8/1987 |

* cited by examiner

*Primary Examiner*—Bernard Lipman
(74) *Attorney, Agent, or Firm*—Shoemaker and Mattare

(57) ABSTRACT

The present invention relates to a process for the preparation of porous polymer particles based on acrylate and/or methacrylate, comprising the steps of provision of a reaction mixture comprising at least one monomer chosen from the group consisting of acrylate and methacrylate compounds, and at least one monoterpene as porogen and of polymerization with the formation of porous polymer particles based on acrylate and/or methacrylate. The present invention also covers the porous polymer particles based on acrylate and/or methacrylate prepared in this way.

12 Claims, No Drawings

PROCESS FOR THE PREPARATION OF POROUS POLYMER PARTICLES BASED ON ACRYLATE AND/OR METHACRYLATE

The present invention relates to a process for the preparation of porous polymer particles based on acrylate and/or methacrylate using at least one monoterpene as porogen, to the porous polymer particles, and to the use thereof for ion chromatography.

Spherical porous polymers are used for a large number of analytical, industrial, medicinal or biological applications. For example, mention may be made of the use of matrices for chromatography methods (such as ion chromatography, size exclusion chromatography or affinity chromatography). Another use possibility consists in the use as drug delivery systems for the improved administration of active ingredients, as described, for example, in U.S. Pat. No. 5,145,675. In addition, spherical porous polymers are used for cell cultivation.

The suitability and performance of the spherical porous polymers is determined essentially by the particle size, the type of polymer (or the monomers from which it is made up), the particle size distribution, the porosity and the nature of the pores, the particle surface, and the swellability. The correct combination of these factors gives the corresponding polymer having the desired properties for the particular application.

For a polymerization in aqueous matrix, a porous structure of the resulting polymer can be achieved by adding a pore-generating substance, a porogen, to the monomer-containing reaction mixture. Porogens have a pore-producing action since, during the polymerization, they enlarge the volume of the growing particles, but without being polymerized themselves. In other words, the porogens occupy volume within the growing particles, which volume cannot be occupied by the growing polymer. When the polymerization is complete, the pyrogen is removed from the polymer by an extraction step. The volumes occupied by the porogen thereby become free in the form of cavities.

Due to the presence and the inclusion of the porogen, the polymer has grown in thinned form. Porogens are therefore also referred to as "thinners".

Depending on the interaction between the porogen and the growing polymer, a distinction is made between solvent porogens, which are a solvent for the growing polymer, and nonsolvent porogens, which are not a solvent for the growing polymer. If the porogen is a good solvent for the growing polymer, fine macroporous and mesoporous polymer regions are formed. This enables uniform pore formation on and in stable polymer spheres.

The porogens used are usually organic solvents, such as alkanes, for example hexane, alcohols, for example decanol, cycloaliphatic alcohols, for example cyclohexanol, and benzene derivatives, such as, for example, toluene. The choice of porogen is virtually independent of the polymerization process used and is made depending on the polymer to be produced.

For the preparation of porous spherical polymers based on polystyrene-divinylbenzene copolymers, use is preferably made of hexane and toluene as porogens. Using these porogens, the pore formation can be readily controlled. In particular, the use of the toluene which acts as solvent for the growing polymer is preferred here.

In contrast to this, the problems with the pore formation of porous spherical polymers based on acrylates or methacrylates are not solved. In particular, the use of polar and/or noncrosslinking acrylates or methacrylates, such as, for example, hydroxyacrylic esters or hydroxymethacrylic esters, produces polymers with unsatisfactory properties due to the relatively high solubility in water of the relatively short-chain monomers. The problem with using acrylates or methacrylates is substantiated by the completely different chemical and physical properties compared with styrene and divinylbenzene.

In the past, alcohols, such as 1-decanol, or cycloaliphatic alcohols, such as cyclohexanol, have been used as porogens for the preparation of porous spherical polymers based on acrylates or methacrylates. However, the polymers resulting therefrom are not of satisfactory quality.

The use of monoterpenes as porogens for the preparation of porous spherical polymers based on acrylates or methacrylates has hitherto not been described.

WO 01/57133 describes thermoplastic shock-resistant compositions which, as well as methacrylate monomers, can also comprise monoterpenes as transfer agents for establishing the molecular weight of the polymer (via chain termination). Examples of this are, however, not described. The monoterpenes are not used here as porogens. No process for the preparation of porous spherical polymers is described either.

In U.S. Pat. No. 5,145,675, microspheres or porous polymeric materials are prepared, inter alia, from methacrylates and used as vehicles for controlled release formulations, i.e. formulations for the controlled release of a medicament. The porogen used here, however, is toluene or heptane. As active ingredients for insect compositions, terpenes are, inter alia, added to the finished spherical porous polymers. A use of monoterpenes as porogens is not described.

It was the object of the present invention to provide an improved process with which porous polymer particles based on acrylate and/or methacrylate can be prepared.

The object is achieved according to the present invention by a process for the preparation of porous polymer particles based on acrylate and/or methacrylate, comprising the steps:

a) provision of a reaction mixture comprising at least one monomer chosen from the group consisting of acrylate and methacrylate compounds, and at least one monoterpene as porogen;

b) polymerization with the formation of porous polymer particles based on acrylate and/or methacrylate.

It has surprisingly been found that the use of monoterpenes as porogens for the preparation of porous polymer particles based on acrylate and/or methacrylate produces uniformly porous particles with a larger pore volume than is possible when using conventional porogens on their own. In particular, it is possible in this way to also incorporate hydrophilic acrylates and/or methacrylates by polymerization without leading to products with unsatisfactory properties.

The polymer particles obtained in this way can therefore be used particularly readily as base material for ion chromatography. Preferably, the polymer comprises already functionalizable groups, which are advantageous for the use as base materials for ion chromatography. For example, the polymers synthesized according to the invention can have functional groups, such as tertiary amines, which can be converted to quaternary ammonium groups.

As described above, the effect of a porogen is virtually independent of the polymerization process used. According to the invention, the following polymerization processes may, for example, be used:

Emulsion Polymerization:

A process in which unsaturated monomers are dispersed in a continuous phase (in most cases water) using an emulsifier. The polymerization is in most cases triggered thermally as a result of the decomposition of an initiator (free-radical initiator). The product is a colloidal dispersion of polymer, called latex. The resulting particles (spheres) are up to 500 nm in size. In the case of a porous product, a monomer/thinner mixture is used.

Soapless Emulsion Polymerization:

A process which proceeds according to the mechanism of emulsion polymerization, but manages without emulsifier. The latex comprises particles which are uniform in size and have diameters up to 1 µm. In the case of a porous product, a monomer/thinner mixture is used.

Seeded Emulsion Polymerization:

In a continuous phase (in most cases water), a polymer latex is swollen with monomer. In addition, emulsifier, initiator and surface-active auxiliaries are used. The polymer particles are uniform in size and have diameters of 3–50 µm. In the case of a porous product, a monomer/thinner mixture is used.

Two-Step Swelling Process in Accordance with Ugelstad:

This is a special variant of the seeded emulsion polymerization. The special feature consists in the fact that the latex particles are more greatly swellable as a result of the entropy gain when using an emulsion of a nonpolar substance and/or water-insoluble initiator. The product comprises absolutely identical-sized (monodisperse) polymer spheres. In the case of a porous product, a monomer/thinner mixture is used.

Suspension Polymerization:

An unsaturated monomer is suspended as discontinuous phase of droplets in a continuous phase (in most cases water) (e.g. by vigorous stirring). The polymerization starts as a result of the thermal disintegration of an initiator soluble in the monomer. The product is a suspension of polydisperse polymer particles, the size range of the process is between 5 and 200 µm in diameter. In the case of a porous product, a monomer/thinner mixture is used.

Seeded Suspension Polymerization:

Seed latex is swollen in a continuous phase with monomer and subjected to suspension polymerization. The product is a monodisperse polymer. In the case of a porous product, a monomer/thinner mixture is used.

Dispersion Polymerization:

A single-phase system of monomer, initiator, auxiliaries and solvent is used. The porosity of the resulting polymer depends on the solvent used.

In the reaction mixture according to the invention at least one monomer is present which is chosen from the group of acrylate and methacrylate compounds. These may be (meth) acrylic ester monomers, for example substituted esters of (meth)acrylic acid and/or substituted (meth)acrylic acids having about 1 to 18 carbon atoms, preferably 1 to 12 carbon atoms. Monomers which can be used according to the invention include acrylic acid (Aac), methacrylic acid (MMac), methyl (meth)acrylate, n-butyl (meth)acrylate, ethyl (meth) acrylate, 2-methylbutyl (meth)acrylate, isooctyl (meth)acrylate, 2-ethylhexyl (meth)acrylate, isononyl (meth)acrylate, decyl (meth)acrylate, dodecyl (meth)acrylate, hexyl (meth)acrylate, isobornyl (meth)acrylate, octadecyl (meth) acrylate, phenoxyethyl (meth)acrylate, alkoxylated alkyl (meth)acrylates, such as ethoxyethoxyethyl (meth)acrylate, ethoxyethyl (meth)acrylate, methoxyethyl (meth)acrylate, methoxyethoxyethyl (meth)acrylate, ethylene glycol di(meth)acrylate (EGDMA), diethylene glycol di(meth)acrylate (DEGDMA), triethylene glycol di(meth) acrylate (TEGDMA), glycidyl (meth)acrylate (GMA), hydroxyethyl (meth)acrylate (HEMA), methyl (meth)acrylate (MMa), polymethyl (meth)acrylate (PPMMA), hydroxypropyl (meth)acrylate (HPMA) and mixtures thereof. According to the present invention, particular preference is given to use of at least one (meth)acrylate with hydrophilic, preferably pronounced hydrophilic, properties. According to the invention, (meth)acrylates with pronounced hydrophilic properties should be understood as meaning those compounds which, as well as the acrylate groups, contain at least one additional functional group with a hydrophilic character, such as, for example, a hydroxyl group. One example of a compound with pronounced hydrophilic character is hydroxypropyl (meth)acrylate (HPMA).

The designation (meth) means that as well as the listed methacrylic compounds also the corresponding acrylic compounds should be included as specified. Any abbreviations present refer in these cases to the corresponding methacrylic compounds.

According to the invention, preference is given to the use of functional (meth)acrylic monomers with a functional group which can be converted into a quaternary ammonium group. These may, for example, be (meth)acrylic monomers with a tertiary amino group. The spherical porous polymers obtainable using such monomers are suitable, in particular, as base material for ion chromatography.

Copolymers of two or more of these monomers are also included by the present invention. In addition, copolymers of acrylates or methacrylates with other monomers, such as, for example styrene or styrene derivatives, such as chlorostyrene or divinylbenzene, are also included by the present invention.

According to the present invention, at least one monoterpene is added as porogen to the reaction mixture for the preparation of the porous polymers based on acrylate or methacrylate. Terpenes are technically polymerization products of isoprene. Monoterpenes is the term used for the compounds which can technically be thought of as oligomers of two isoprene units, i.e. consist of a backbone of 10 carbon atoms.

According to the present invention, the porogens used are preferably the following monoterpenes: citronellal, carvone, dihydrocarvone, menthone, cuminaldehyde, thujone, fenchone, camphor, safranal, borneol, carveol, α-terpeneol, dihydrocarveol, geraniol, nerol, nerolidol, citronellol, lavandulol, ipsdienol, ipsenol, piperitol, pulegol, 1,8-cineol, 1,4-cineol, linalool, perilla alcohol, myrcenol, sabinene hydrate, carvacrol, thymol, menthol, camphene, pinene, limonene, α-phellandrene, β-phellandrene, sabinene, terpinene, myrcene. It is particularly preferred according to the invention to use linalool as porogen.

The use of monoterpenes as porogens for the preparation of porous polymer particles based on acrylate and/or methacrylate gives uniformly porous particles with a defined pore structure having, preferably, a larger pore volume than is possible when using conventional porogens on their own. Monoterpenes are good solvents for growing polymer particles based on acrylate and/or methacrylate.

According to a preferred embodiment of the present invention, as well as the at least one monoterpene as porogen, as least one further porogen which is not a monoterpene is also added. Preference is given to adding an organic solvent as the further porogen. Particular preference is given to adding an organic solvent which is chosen from the group consisting of alkanes, such as hexane, alcohols, such as decanol, cyclic alcohols, such as cyclohexanols, and aromatic hydrocarbons, such as toluene. According to the invention, particular preference is given to adding toluene as additional porogen.

Use of an additional porogen which is not a monoterpene is advantageous particularly in the case of a seeded polymerization process, such as the two-step swelling process in accordance with Ugelstad, if the seed material used is substances for which monoterpenes do not act as solvents. For example, monoterpenes are not solvents for polystyrene seed particles. In this case, a porogen should be added which acts as solvent for these seed particles. In the case of polystyrene seed material, toluene can, for example, be used as additional porogen. Toluene is a solvent for the polystyrene seed particles, but not for the growing polymer based on acrylate or methacrylate. On the other hand, the at least one monoterpene as porogen is a solvent for the growing polymer based on acrylate or methacrylate, but not for the polystyrene seed particles. This thus results in encapsulation of the seed particles in the growing polymer based on acrylate or methacrylate. This is referred to as excluded seed. As a result of subsequent pore extraction, the encapsulated seed material can be removed. Empty pores are left behind. A combination of porogens which is particularly preferred here according to the invention consists in the combination of linalool and toluene.

As well as the monomers and the porogen, the reaction mixture for the preparation of porous spherical polymers has a polymerization initiator as further constituent. These are compounds from which, as a result of chemical, thermal or photochemical reactions, an active species can be produced which reacts with a monomer and thereby triggers the actual polymerization reaction. The polymerization of acrylic or methacrylic monomers takes place primarily as a result of a free-radical chain polymerization. The initiators used for free-radical chain polymerizations may be chemical compounds which readily form free radicals. These include azo compounds, peroxides, hydroperoxides or peracid esters. It is, however, also possible to use redox initiators. These consists of oxidizing and reducing components. The reaction of these components with one another produces free radicals. A typical redox initiator system is hydrogen peroxide in combination with iron(II) ions.

The reaction mixture according to the invention can also comprise emulsifiers if the intention is to use an emulsion polymerization process for the preparation. These are surface-active substances, such as, for example, alkanesulphonate salts, such as sodium dodecyl sulphate. The type and choice of suitable emulsifiers depending on the monomers used is known to the person skilled in the art.

The reaction mixtures according to the invention can optionally comprise further constituents, such as, for example, solvents. The type and choice of suitable additives is known to the person skilled in the art.

The procedure of the polymerization processes listed above is known to the person skilled in the art. With regard to the two-step swelling process in accordance with Ugelstad, reference is made to U.S. Pat. No. 4,336,173, the contents of which in this regard are expressly incorporated herein by reference.

According to the present invention, porous spherical polymer particles based on acrylate and/or methacrylate are obtained which, compared with porous polymer particles based on acrylate and/or methacrylate which have been obtained in a conventional manner, are characterized by a uniform and defined pore structure with a relatively large pore volume. The particles according to the invention are characterized by a diameter of from 2 to 10 μm, preferably 3 to 6 μm. They have a pore volume of from 0.5 to 2.0 ml/g of polymer, in particular from 0.8 to 1.7 ml/g of polymer. They also have an average pore size of from 1 to 25 nm, in particular from 2 to 20 nm.

In the process according to the invention, secondary particles are additionally produced as by-products. Surprisingly, these are likewise characterized by a clearly porous structure.

The porous spherical polymer particles based on acrylate or methacrylate prepared according to the invention can be used, for example, as matrices for chromatography methods (such as ion chromatography, size exclusion chromatography or affinity chromatography), as drug delivery systems for the improved administration of active ingredients, and for cell cultivation.

The present invention is illustrated in more detail below by reference to nonlimiting examples.

EXAMPLE 1

Monodisperse porous EGDMA-HPMA copolymer of diameter 4.5 μm was prepared in accordance with the two-step swelling process according to Ugelstad et al., (described in U.S. Pat. No. 4,336,173). The synthesis takes place in a cylindrical, jacketed glass reactor (total volume 950 ml) with cover and 4 glass paddle stirrers under protective gas.

10 ml of a high-pressure homogenized emulsion of 15.78 g of Perkadox SE-8 (dioctanoyl peroxide), 56.7 g of ultrapure water, and 1.0 g of sodium dodecyl sulphate were added to 12.5 ml of polystyrene seed latex (10% strength in water, 1.5 μm in diameter) in 75 ml of ultrapure water with gentle stirring at 30° C. 5 ml of acetone dissolved in 15 ml of ultrapure water were added dropwise at an increased stirring rate. After 12–15 h under gentle stirring at 30° C., the acetone was removed by means of reduced pressure (200–400 mbar). 600 mg of Berol 267 (nonylphenol ethoxylate) in 45 ml of ultrapure water were added, followed by 100 ml of ultrapure water. At a moderate stirring speed, a monomer/porogen mixture of 27 ml of EGDMA, 9 ml of HPMA, 36 ml of toluene (porogen 1), and 12 ml of linalool (porogen 2) was added. After 2–3 h, the organic phase was filtered off with suction from the seed particles, and a further 100 ml of water are added. The polymerization took place at 65° C. for 24 h at a relatively high stirring speed.

This gave a rather microporous polymer consisting of fragmented hollow spheres with a diameter of 4.5 μm, and also smaller secondary particles measuring about 0.5 to 1 μm (the diameter was determined by means of scanning electron microscopy, SEM). The pore volume, determined using size exclusion chromatography (SEC), using polystyrene standard and alkylbenzene standard (eluent:tetrahydrofuran), was 0.76 ml/g of polymer.

EXAMPLE 2

The procedure was carried out as described in Example 1. The monomer/porogen mixture comprised 27 ml of EGDMA, 9 ml of HPMA, and 24 ml of toluene (porogen 1) and 24 ml of linalool (porogen 2). The resulting polymer had irregular, markedly macroporous particles measuring 3.5 μm, and secondary particles.

EXAMPLE 3

The procedure was carried out as described in Example 1. The monomer/porogen mixture comprised 27 ml of EGDMA, 9 ml of HPMA, and 12 ml of toluene (porogen 1) and 36 ml of linalool (porogen 2). This gave regular shaped macroporous particles with a diameter of 4.5 µm with few flat cavity-like defects, and secondary particles. The pore volume (SEC, polystyrene standard) was 1.01 ml/g of polymer.

EXAMPLE 4

The procedure was carried out as described in Example 1. The monomer/porogen mixture comprised 27 ml of EGDMA, 9 ml of HPMA, and 48 ml of linalool (porogen 2). This gave virtually regularly shaped mesomacroporous particles with a diameter of 4.5 µm with few superficial cavity-like defects, and secondary particles. The pore volume (SEC, polystyrene standard) was 1.31 ml/g of polymer.

EXAMPLE 5

The procedure was carried out as described in Example 1. The monomer/porogen mixture comprised 27 ml of EGDMA, 9 ml of THFMA, and 48 ml of linalool (porogen 2). By reference to the microscopic assessment (REM), a polymer corresponding to the polymer of Example 4 was obtained.

The pore volume (SEC, polystyrene standard) was 1.30 ml/g of polymer.

EXAMPLE 6

The procedure was carried out as described in Example 1. The monomer/porogen mixture comprised 27 ml of EGDMA, 9 ml of allyl chloroacetate and 48 ml of linalool (porogen 2). The polymer obtained was virtually analogous to the polymer according to 4, although the defects were deeper. Many secondary particles were obtained.

The pore volume (SEC, polystyrene standard) was 1.45 ml/g of polymer.

EXAMPLE 7

The procedure was carried out as described in Example 1. The monomer/porogen mixture comprised 27 ml of EGDMA, 9 ml of HEMA and 12 ml of toluene (porogen 1) and 36 ml of linalool (porogen 2). This gave uniform polymer spheres with a diameter of 4.5 µm and very small defects akin to bullet holes, and also secondary particles.

The polymer spheres were hollow.

EXAMPLE 8

The procedure was carried out as described in Example 1. The monomer/porogen mixture comprised 27 ml of EGDMA, 9 ml of HEMA and 48 ml of linalool (porogen 2). This gave macroporous, rather irregular polymer spheres with a diameter of 4.5 µm with significant hole-like defects.

The pore volume (SEC, polystyrene standard) was 1.13 ml/g of polymer.

EXAMPLE 9

The procedure was carried out as described in Example 1. The monomer/porogen mixture comprised 27 ml of EGDMA, 9 ml of HPMA and 36 ml of toluene (porogen 1) and 12 ml of geraniol (porogen 3).

The pore volume (SEC, polystyrene standard) was 0.46 ml/g of polymer.

EXAMPLE 10

The procedure was carried out as described in Example 1. The monomer/porogen mixture comprised 27 ml of EGDMA, 9 ml HPMA and 24 ml of toluene (porogen 1) and 24 ml of geraniol (porogen 3).

The pore volume (SEC, polystyrene standard) was 0.92 ml/g of polymer.

EXAMPLE 11

The procedure was carried out as described in Example 1. The monomer/porogen mixture comprised 27 ml of EGDMA, 9 ml HPMA and 12 ml of toluene (porogen 1) and 36 ml of geraniol (porogen 3).

The pore volume (SEC, polystyrene standard) was 1.06 ml/g of polymer.

EXAMPLE 12

The procedure was carried out as described in Example 1. The monomer/porogen mixture comprised 27 ml of EGDMA, 9 ml HPMA and 48 ml of geraniol (porogen 3). The polymer had a smoother action than the polymer according to Example 4, although the defects were somewhat deeper. Additionally, secondary particles were obtained.

COMPARATIVE EXAMPLE 1

The procedure was carried out as described in Example 1. The monomer/porogen mixture comprised 27 ml of EGDMA, 9 ml HPMA and 36 ml of toluene (porogen 1) and 12 ml of 1-decanol. The particles were virtually regular and macroporous. Cavity-like structures were visible. The particle diameter was 4 µm.

The pore volume (SEC, polystyrene standard) was 0.72 ml/g of polymer.

COMPARATIVE EXAMPLE 2

The procedure was carried out as described in Example 1. The monomer/porogen mixture comprised 27 ml of EGDMA, 9 ml HPMA and 12 ml of toluene (porogen 1) and 36 ml of 1-decanol. The particles were rather irregular spheres with coarse agglomerates and macroporous. The particle diameter was 4 µm.

The pore volume (SEC, polystyrene standard) was 0.55 ml/g of polymer.

COMPARATIVE EXAMPLE 3

The procedure was carried out as described in Example 1. The monomer/porogen mixture comprised 27 ml of EGDMA, 9 ml HPMA and 36 ml of toluene (porogen 1) and 12 ml of n-hexane. The particles were smooth spheres with a wall thickness of 0.5 µm, which were hollow on the inside. The particle diameter was 5 µm.

The pore volume (SEC, polystyrene standard) was 1.30 ml/g of polymer.

A comparison of Examples 1 and 2 with Comparative Examples 1 and 3 shows that the use of a monoterpene as porogen leads, compared to the use of 1-decanol, to uniform particles with a higher pore volume. The use of n-hexane as porogen in addition to toluene led, according to Comparative Example 3 to unacceptable, unstable particles. The particles obtained according to the Comparative Examples were either significantly irregularly shaped or hollow spheres and therefore unsuitable for industrial use.

We claim:

1. Process for the preparation of porous polymer particles based on acrylate and/or methacrylate, comprising the steps:
    a) provision of the reaction mixture comprising at least one monomer chosen from the group consisting of acrylate and methacrylate compounds, and at least one monoterpene as porogen;
    b) polymerization with the formation of porous polymer particles based on acrylate and/or methacrylate.

2. Process according to claim 1, wherein the monoterpene or monoterpenes are chosen from the group consisting of citronellal, carvone, dihydrocarvone, menthone, cuminaldehyde, thujone, fenchone, camphor, safranal, borneol, carveol, α-terpeneol, dihydrocarveol, geraniol, nerol, nerolidol, citronellol, lavandulol, ipsdienol, ipsenol, piperitol pulegol, 1,8-cineol, 1,4-cineol, linalool perilla alcohol, myrcenol, sabinene hydrate, carvacrol, thymol, menthol, camphene, pinene, limonene, α-phellandrene, β-phellandrene, sabinene, terpinene, myrcene.

3. Process according to claim 1, wherein the monoterpene is linalool.

4. Process according to claim 1, wherein an additional porogen is added to the reaction mixture in step a).

5. Process according to claim 4, wherein the additional porogen is an organic solvent.

6. Process according to claim 4, wherein the additional porogen is chosen from the group consisting of alkanes, alcohols, cyclic alcohols, and aromatic hydrocarbons.

7. Process according to claim 1, wherein the reaction mixture comprises linalool and toluene as porogens.

8. Process according to claim 1, wherein the process is a process chosen from the group consisting of emulsion polymerization, soapless emulsion polymerization, seeded emulsion polymerization, the two-step swelling process in accordance with Ugelstad, multi step swelling processes, suspension polymerization, seeded suspension polymerization and dispersion polymerization.

9. Process according to claim 1, wherein the process is a two-step swelling process in accordance with Ugelstad.

10. Process according to claim 1, wherein the monomers used are acrylates or methacrylates with additional functional groups.

11. Process according to claim 10, wherein said additional functional groups are groups which can be converted to quaternary ammonium groups.

12. Process according to claim 1, wherein at least one acrylate or methacrylate with pronounced hydrophilic properties is used.

* * * * *